Patented July 16, 1946

2,404,299

UNITED STATES PATENT OFFICE 2,404,299

SUBSTITUTED IMIDAZOLES

Lucas P. Kyrides, Webster Groves, Mo., assignor to Monsanto Chemical Company, St. Louis, Mo., a corporation of Delaware No Drawing. Application March 3, 1944, Serial No. 524,929

7 Claims. (Cl. 260—309)

The present invention relates to the production of new therapeutic agents and insecticide toxicants which are substituted imidazole compounds, and comprises the method of producing the compounds as well as the new products themselves.

According to the present invention, generally stated, new products which are of outstanding value as active agents against micro-organisms are made by preparing substituted imidazoles of the type represented by the formula:

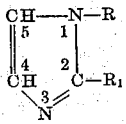

in which R represents an acyclic hydrocarbon radical having from 10 to 16 carbon atoms in its structure and $R_1$ represents an acyclic hydrocarbon radical having from 1 to 5 carbon atoms in its structure. The acyclic hydrocarbon radical represented by R may be composed of a straight chain alkyl radical such as the decyl, undecyl, dodecyl, tridecyl, tetradecyl, pentadecyl and hexadecyl radicals, or a straight chain alkenyl radical, such as decenyl, undecenyl, dodecenyl, tridecenyl, tetradecenyl, pentadecenyl and hexadecenyl radicals in which one or more double bonds may be located in various positions in the chain. $R_1$ may be a straight chain alkyl radical such as the methyl, ethyl, propyl, butyl and amyl radicals, or a branched chain alkyl radical such as the isopropyl, tertiary butyl and isoamyl radicals. Likewise, $R_1$ may be an alkenyl radical having from 1 to 5 carbon atoms in its straight or branched chain structure, for example, the propenyl, butenyl and isobutenyl radicals. The water-soluble salts of these compounds may be prepared and are also valuable as active agents against micro-organisms and as insecticide toxicants. For example, the hydrochlorides, hydrobromides and acetates and other salts may be employed.

The new products and their water-soluble salts may be administered orally or parenterally and have been found to be unusually effective against micro-organisms such as streptococcus in vitro and in vivo. The organic and inorganic acid salts may be prepared by dissolving the products in an aqueous solution containing the stoichiometrical equivalent of a suitable acid, such as hydrochloric, hydrobromic, acetic acids and the like, and the solution may be employed for parenteral administration. Also, the acid salts may be prepared during the synthesis of the imidazole derivative or immediately thereafter and before the product is isolated from the reaction mixture.

The products of the present invention have also been found to possess utility as insecticides and toxicants for insecticide compositions, such as sprays and powders in which the compounds are blended with suitable wetting agents, fillers, solvents, adhesives, coating agents, repellents and other ingredients employed in compounding insecticides.

The products of the present invention may be prepared by reacting ethylene diamine with a molecular equivalent or less of an acylating agent comprising an aliphatic monocarboxylic acid having as its alkyl or alkenyl residue one of the radicals described hereinbefore in the definition of $R_1$ with respect to the formula. The acid thus employed will be composed of an alkyl or alkenyl residue of the proper chain length or with the proper branched chain components together with a carboxylic acid group, the carbon atom of which is not included in the contemplation of the chain length hereinbefore described. In place of the acid, the alkyl ester, such as the butyl ester, or desirably the methyl or ethyl ester, may be employed, or the acyl halide such as the acyl chloride, or the acid anhydride.

The resulting mono-acyl amino derivative is then condensed with the aid of a suitable mild dehydrating agent, such as powdered calcium oxide, to form the 2-alkyl (or 2-alkenyl) imidazoline. The derivative thus prepared is then reacted with an alkylating agent having as its alkyl residue one of the residues described hereinbefore in the definition of R with respect to the formula. The alkylating agent may be an alkyl halide, such as lauryl chloride or tridecyl bromide. The derivative thus prepared is then dehydrogenated with the aid of a suitable dehydrogenation catalyst, such as nickel, to form the 1-alkyl (or alkenyl)-2-alkyl (or alkenyl) imidazole.

In carrying out the preparation of the N-acyl ethylene diamine, it is desirable to employ anhydrous ethylene diamine. However, ethylene diamine that is not substantially anhydrous may be employed. The anhydrous material facilitates the attainment of somewhat higher yields.

The following examples illustrate the process of the present invention and the compounds resulting therefrom. These examples are to be construed as merely illustrating and not as limiting the scope of the present invention.

Example 1

1-n-Dodecyl-2-methyl-imidazole

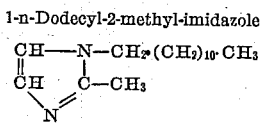

A mixture of 264 grams of anhydrous ethyl acetate (3 moles) and 540 grams of ethylene diamine (9 moles) was heated in an autoclave at 100–110° C. for 36 hours. A pressure of about 20 pounds was developed. The mixture was transferred to a still and the ethanol and excess ethylene diamine were distilled off at about 100 mm. absolute pressure. The fractionation yielded 203 grams (66.5%) of partially crystallized N-acetyl ethylene diamine at 133–139° C./27 mm.

A mixture of 203 grams of N-acetyl ethylene diamine and 560 grams of finely powdered calcium oxide was heated in a flask immersed in an oil bath at 225–235° C. for 14 hours. After cooling to 90–100° C., the mixture was extracted with three 500 cc. portions of alcohol. The alcohol was removed from the extract by distillation and the residue was distilled at atmospheric pressure. B. P. 195–198° C. Yield of 2-methyl-4,5-dihydroimidazole, 88%.

A mixture of 100.3 grams of 2-methyl-4,5-dihydroimidazole, 123.0 grams of n-dodecyl chloride (0.6 mole) and 200 cc. of xylene was refluxed at 148° C. for 16 hours and then cooled to 25° C. A solution of 50 grams of 50% sodium hydroxide solution in 33 cc. of water was added with agitation. The mixture was filtered and the xylene layer was separated from the filtrate. After removal of the xylene under reduced pressure, the residue was distilled, B. P. 177–184° C./6 mm. The yield was 60.7 grams, or 40.2%, calculated on n-dodecyl chloride charged. The product assayed 98.6% of 1-n-dodecyl-2-methyl-4,5-dihydroimidazole.

In place of n-dodecyl chloride, n-dodecyl bromide may be employed.

For the dehydrogenation of 1-n-dodecyl-2-methyl-4,5-dihydroimidazole, a nickel catalyst was prepared by heating nickel formate in a mineral oil until decomposition of the formate occured. The nickel catalyst may be prepared by other methods, for example, the method disclosed in U. S. Patent 1,378,736, issued May 17, 1921, to Ellis. Other suitable dehydrogenation catalysts, such as Raney nickel catalysts, may be employed. A mixture of 3.2 grams of the catalyst thus prepared and 60.7 grams of 1-n-dodecyl-2-methyl-4,5-dihydroimidazole was heated with agitation to 225°–235° C. until hydrogen was no longer evolved. The reaction mixture was cooled to 125° C. and ½ gram of the nickel catalyst was added. Heating was resumed and continued until the evolution of hydrogen ceased. The reaction mixture was then distilled in vacuo. The distilled product was 1-n-dodecyl-2-methyl-imidazole.

Example 2

1-n-Decyl-2-methyl-imidazole

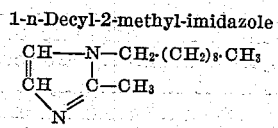

A mixture of 50.4 grams (0.6 mole) of 2-methyl-4,5-dihydroimidazole, prepared according to the method of Example 1, 52.8 grams (0.3 mole) of decyl chloride and 100 cc. of benzene was refluxed for 7 hours and cooled to room temperature. The mixture was treated with 150 cc. of water and 24 grams of 50% sodium hydroxide solution with agitation and filtered. The benzene layer of the filtrate was separated and distilled to remove the benzene. The residue was distilled at reduced pressure to recover the product. B. P. 151–155° C./6 mm. Yield of 1-n-decyl-2-methyl-4,5-dihydroimidazole, 41.3%. The material assayed 99.8%. This material was dehydrogenated according to the method of Example 1. Yield of 1-n-decyl-2-methyl-imidazole, 90.5% of theory. B. P. 153–160° C./5.5 mm.

Example 3

1-n-Tetradecyl-2-methyl-imidazole

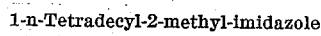

A mixture of 60.7 grams of 2-methyl-4,5-dihydroimidazole prepared according to the method of Example 1, 83 grams of tetradecyl chloride and 110 cc. of xylene was refluxed 18 hours at 145° C. The mixture was cooled to room temperature and diluted with 125 cc. of water. To this mixture, 27.5 grams of 50% sodium hydroxide was added with agitation. The resulting mixture was filtered and the xylene layer was separated and distilled to remove the xylene. The residue was distilled at reduced pressure to recover the product. B. P. 190–193° C./6 mm. Yield of 1-n-tetradecyl-2-methyl-4,5-dihydroimidazole, 34%. The material assayed 97.4%. This material was dehydrogenated according to the method of Example 1. The product was 1-n-tetradecyl-2-methyl-imidazole. B. P. 187–199° C./5.5 mm.

Example 4

1-n-Dodecyl-2-n-amyl-imidazole

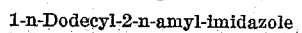

A mixture of 427.7 grams of anhydrous methyl caproate and 592 grams of anhydrous ethylene diamine was reacted according to the method of Example 1. The N-caproyl-ethylene diamine obtained was condensed with the aid of anhydrous calcium oxide according to the method of Example 1. The product was identified as 2-amyl-4,5-dihydroimidazole. B. P. 150–157° C./34 mm. The yield of this material was 56.8%, based on methyl caproate. The M. P. of the material was 53–54.6° C.

A mixture of 168 grams of 2-amyl-4,5-dihydroimidazole, 123 grams of n-dodecyl chloride and 200 cc. of xylene was reacted according to the method of Example 1, and the resulting reaction mixture was treated with 50 grams of 50% sodium hydroxide solution in 300 cc. of water. After filtration, removal of xylene from the non-aqueous layer and distillation of the residue, the material recovered was identified as 1-n-dodecyl-2-n-amyl-4,5-dihydroimidazole. This material was dehydrogenated according to the method of Example 1. The product was 1-n-dodecyl-2-amyl-imidazole. Yield 95.2%; B. P. 175–200° C./3.5 mm.

Example 5

1-n-Hexadecyl-2-methyl-imidazole

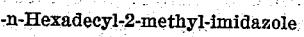

This compound may be prepared by reacting a mixture of 101 grams of 2-methyl-4,5-dihydroimidazole prepared according to Example 1, 144 grams of hexadecyl chloride and 110 cc. of xylene and processing the reaction mixture according to the method of Example 2. The resulting material, 1 - n - hexadecyl-2-methyl-4,5-dihydroimidazole, may then be dehydrogenated according to the method of Example 1 to produce 1-n-hexadecyl-2-methyl-imidazole.

Example 6

1-n-Tridecyl-2-methyl-imidazole $$\begin{array}{c}\text{CH}-\!\!-\!\!\text{N}-\text{CH}_2\cdot(\text{CH}_2)_{11}\cdot\text{CH}_3\\ \|\quad\quad|\\ \text{CH}\quad\text{C}-\text{CH}_3\\ \diagdown\!\!\diagup\\ \text{N}\end{array}$$

This product was prepared by reacting 2-methyl-4,5-dihydroimidazole with tridecyl bromide according to the method of Example 2, and dehydrogenating the resulting 1-n-tridecyl-2-methyl-4,5-dihydroimidazole according to the method of Example 1.

Example 7

1-n-Dodecyl-2-ethyl-imidazole $$\begin{array}{c}\text{CH}-\!\!-\!\!\text{N}-\text{CH}_2\cdot(\text{CH}_2)_{10}\cdot\text{CH}_3\\ \|\quad\quad|\\ \text{CH}\quad\text{C}-\text{CH}_2\cdot\text{CH}_3\\ \diagdown\!\!\diagup\\ \text{N}\end{array}$$

This compound may be prepared by reacting a mixture of anhydrous methyl propionate and an excess of anhydrous ethylene diamine according to the method of Example 1 to form N-propionyl ethylene diamine. This product may be condensed with calcium oxide according to the method of Example 1 to form 2-ethyl-4,5-dihydroimidazole. This latter product may be reacted with n-dodecyl chloride according to the method of Example 2 to form 1-n-dodecyl-2-ethyl-4,5-dihydroimidazole. This material may then be dehydrogenated according to the method of Example 1 to form 1-n-dodecyl-2-ethyl-imidazole.

Example 8

1-n-Dodecyl-2-propenyl-imidazole $$\begin{array}{c}\text{CH}-\!\!-\!\!\text{N}-\text{CH}_2\cdot(\text{CH}_2)_{10}\cdot\text{CH}_3\\ \|\quad\quad|\\ \text{CH}\quad\text{C}-\text{CH}=\text{CH}\cdot\text{CH}_3\\ \diagdown\!\!\diagup\\ \text{N}\end{array}$$

This compound may be prepared by reacting a mixture of anhydrous methyl crotonate and an excess of anhydrous ethylene diamine according to the method of Example 1 to produce N-crotonyl ethylene diamine. This product may be condensed with calcium oxide according to the method of Example 1 to produce 2-propenyl-4,5-dihydroimidazole. This latter product may then be reacted with n-dodecylchloride according to the method of Example 1 with the resultant production of 1-n-dodecyl-2-propenyl-4,5-dihydroimidazole. This material may then be dehydrogenated according to the method of Example 1 to form 1-n-dodecyl-2-propenyl-imidazole.

Example 9

1-n-Dodecyl-2-isopropyl-imidazole $$\begin{array}{c}\text{CH}-\!\!-\!\!\text{N}-\text{CH}_2\cdot(\text{CH}_2)_{10}\cdot\text{CH}_3\\ \|\quad\quad|\quad\quad\quad\text{CH}_3\\ \text{CH}\quad\text{C}-\text{CH}-\text{C}\diagup\\ \diagdown\!\!\diagup\quad\quad\quad\diagdown\text{CH}_3\\ \text{N}\end{array}$$

This compound may be prepared by reacting a mixture of anhydrous methyl isobutyrate and an excess of anhydrous ethylene diamine according to the method of Example 1. The resulting product, N-isobutyryl ethylene diamine, is condensed with calcium oxide according to the method of Example 1 to produce 2-isopropyl-4,5-dihydroimidazole. This latter may then be reacted with n-dodecyl chloride according to the method of Example 2 with the resultant production of 1-n-dodecyl-2-isopropyl-4,5-dihydroimidazole. This material may then be dehydrogenated according to the method of Example 1 to form 1-n-dodecyl-2-isopropyl-imidazole.

Example 10

1-Dodecyl-2-isobutenyl-imidazole $$\begin{array}{c}\text{CH}-\!\!-\!\!\text{N}-\text{CH}_2\cdot(\text{CH}_2)_{10}\cdot\text{CH}_3\\ \|\quad\quad|\quad\quad\quad\text{CH}_3\\ \text{CH}\quad\text{C}-\text{CH}=\text{C}\diagup\\ \diagdown\!\!\diagup\quad\quad\quad\diagdown\text{CH}_3\\ \text{N}\end{array}$$

This compound may be prepared by reacting a mixture of anhydrous methyl dimethacrylate and an excess of anhydrous ethylene diamine according to the method of Example 1. The product recovered from the reaction mixture, N-dimethacroyl ethylene diamine, is then condensed with calcium oxide with the resultant production of 2-isobutenyl-4,5-dihydroimidazole. This latter product may then be reacted with n-dodecyl chloride according to the method of Example 2 to form 1-n-dodecyl-2-isobutenyl-4,5-dihydroimidazole. This material may then be dehydrogenated according to the method of Example 1 to form 1-dodecyl-2-isobutenyl-imidazole.

Example 11

1-(n-Dodecen-11-yl-1)-2-methyl-imidazole $$\begin{array}{c}\text{CH}-\!\!-\!\!\text{N}-\text{CH}_2\cdot(\text{CH}_2)_9\cdot\text{CH}=\text{CH}_2\\ \|\quad\quad|\\ \text{CH}\quad\text{C}-\text{CH}_3\\ \diagdown\!\!\diagup\\ \text{N}\end{array}$$

This compound may be prepared by reacting a mixture of 101 grams of 2-methyl-4,5-dihydroimidazole, prepared according to Example 1, 122 grams of 11-n-dodecenyl chloride and 200 cc. of xylene according to the method of Example 1, and treating resulting reaction mixture as in Example 1 to recover the product. This product may then be dehydrogenated according to the method of Example 1 to form 1-(n-dodecen-11-yl-1)-2-methyl-imidazole.

Example 12

1-(n-Tetradecen-12-yl-1)-2-propenyl-imidazole $$\begin{array}{c}\text{CH}-\!\!-\!\!\text{N}-\text{CH}_2\cdot(\text{CH}_2)_{10}\cdot\text{CH}=\text{CH}-\text{CH}_3\\ \|\quad\quad|\\ \text{CH}\quad\text{C}-\text{CH}=\text{CH}\cdot\text{CH}_3\\ \diagdown\!\!\diagup\\ \text{N}\end{array}$$

This compound may be prepared by reacting a mixture of 132 grams of 2-propenyl-4,5-dihydroimidazole, prepared as in Example 8 according to the method of Example 1, 138 grams of 12-tetradecenyl chloride and 200 cc. of xylene according to the method of Example 1, and treating resulting reaction mixture as in Example 1 to recover the product.

Example 13

1-n-Decyl-2-amyl-imidazole $$\begin{array}{c}\text{CH}-\!\!-\!\!\text{N}-\text{CH}_2\cdot(\text{CH}_2)_8\cdot\text{CH}_3\\ \|\quad\quad|\\ \text{CH}\quad\text{C}-\text{CH}_2\cdot(\text{CH}_2)_3\cdot\text{CH}_3\\ \diagdown\!\!\diagup\\ \text{N}\end{array}$$

A mixture of 2 mols of 2-amyl-4,5-dihydroimidazole, prepared according to the method of Example 4, and one mol of n-decyl chloride was heated at 144–150° C. for 15 hours. The reaction product was diluted with water, treated with a 5% excess of 50% sodium hydroxide, and extracted with n-butyl alcohol. The butyl alcohol and some unreacted 2-amyl-4,5-dihydroimidazole were removed from the extract by distillation. The residue was distilled, B. P. 143–174.5°/3.5 mm., and thereafter redistilled, B. P. 157–170°/3.5 mm. This material was dehydrogenated according to the method of Example 1. The product was 1-n-decyl-2-amyl-imidazole. Yield 93.8%; B. P. 149–176° C./3.5 mm.

The present invention is a continuation-in-part of my copending application S. N. 498,583, filed August 13, 1943, which discloses the 4,5-dihydroimidazole derivatives from which the novel therapeutic agents of the present invention may be derived as explained hereinbefore.

I claim:

1. A compound of the group consisting of substituted imidazoles of the formula type:

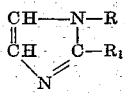

in which R represents an acyclic hydrocarbon radical having from 10 to 16 carbon atoms in its structure and $R_1$ represents an acyclic hydrocarbon radical having from 1 to 5 carbon atoms in its structure and acid salts thereof, prepared for use as therapeutic agents.

2. Substituted imidazoles of the formula type:

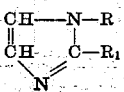

in which R represents a straight chain alkyl radical having from 10 to 16 carbon atoms in its structure and $R_1$ represents an acyclic hydrocarbon radical having from 1 to 5 carbon atoms in its structure, prepared for use as therapeutic agents.

3. The 1-n-decyl-2-methyl-imidazole of the formula:

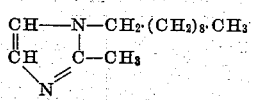

prepared for use as a therapeutic agent.

4. The 1-n-dodecyl-2-methyl-imidazole of the formula:

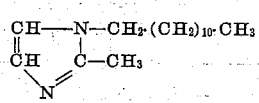

prepared for use as a therapeutic agent.

5. The 1-n-tetradecyl-2-methyl-imidazole of the formula:

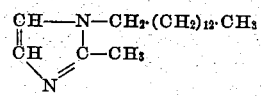

prepared for use as a therapeutic agent.

6. A process for preparing compounds of the formula type:

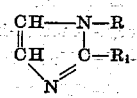

in which R represents an acyclic hydrocarbon radical having from 10 to 16 carbon atoms in its structure and $R_1$ represents an acyclic hydrocarbon radical having from 1 to 5 carbon atoms in its structure, said process comprising reacting ethylene diamine with an alkyl ester of a monocarboxylic acid in which a carboxylic group is attached to a radical selected from the group of radicals defined hereinbefore as $R_1$, heating the ethylene diamine derivative thus formed in the presence of a mild dehydrating agent, reacting the derivative thus formed with an alkyl halide having an alkyl radical selected from the group of radicals defined hereinbefore as R, heating the derivative thus formed with a dehydrogenation catalyst and distilling off the dehydrogenation product.

7. A process for preparing compounds of the formula type:

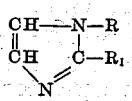

in which R represents a straight chain alkyl radical having from 10 to 16 carbon atoms in its structure and $R_1$ represents an acyclic hydrocarbon radical having from 1 to 5 carbon atoms in its structure, said process comprising reacting ethylene diamine with an alkyl ester of a monocarboxylic acid in which a carboxylic group is attached to a radical selected from the group of radicals defined hereinbefore as $R_1$, heating the ethylene diamine derivative thus formed in the presence of a mild dehydrating agent, reacting the derivative thus formed with an alkyl halide having an alkyl radical selected from the group of radicals defined hereinbefore as R, heating the derivative thus formed with a dehydrogenation catalyst and distilling off the dehydrogenation product.

LUCAS P. KYRIDES.